US012126108B2

(12) United States Patent
Nozaki

(10) Patent No.: US 12,126,108 B2
(45) Date of Patent: Oct. 22, 2024

(54) CONNECTOR HAVING FIRST HOUSING AND SECOND HOUSING CONNECTABLE TO EACH OTHER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventor: Shinji Nozaki, Mie (JP)

(73) Assignees: AUTONETWORKS TECHNOLOGIES, LTD., Mie (JP); SUMITOMO WIRING SYTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 348 days.

(21) Appl. No.: 17/634,188

(22) PCT Filed: Aug. 19, 2020

(86) PCT No.: PCT/JP2020/031217
§ 371 (c)(1),
(2) Date: Feb. 9, 2022

(87) PCT Pub. No.: WO2021/039518
PCT Pub. Date: Mar. 4, 2021

(65) Prior Publication Data

US 2022/0360011 A1 Nov. 10, 2022

(30) Foreign Application Priority Data

Aug. 30, 2019 (JP) ................................ 2019-158301

(51) Int. Cl.
*H01R 13/424* (2006.01)
*H01R 13/453* (2006.01)
*H01R 13/631* (2006.01)

(52) U.S. Cl.
CPC ....... *H01R 13/424* (2013.01); *H01R 13/4538* (2013.01); *H01R 13/631* (2013.01)

(58) Field of Classification Search
None
See application file for complete search history.

(56) References Cited

U.S. PATENT DOCUMENTS 5,344,347 A 9/1994 Inoue et al.
5,472,357 A 12/1995 Yamanashi
(Continued)

FOREIGN PATENT DOCUMENTS

JP 2007-134237 A 5/2007
JP 2009-004174 A 1/2009
(Continued)

OTHER PUBLICATIONS

International Search Report issued on Nov. 2, 2020 for WO 2021/039518 A1 (4 pages).

*Primary Examiner* — Oscar C Jimenez
(74) *Attorney, Agent, or Firm* — Venjuris, P.C.

(57) ABSTRACT

It is aimed to realize a size reduction. A connector includes a first housing (10) and a second housing (20) connectable to each other. The second housing (20) is configured by assembling a first terminal holding member (21) and a second terminal holding member (32) to be relatively displaceable. The first housing (10) is provided with a restricting portion (16) for allowing a connecting operation of the first terminal holding member (21) and restricting a connecting operation of the second terminal holding member (32). The first terminal holding member (21) is provided with a restriction releasing portion (27) for releasing restric- (Continued)

tion by the restricting portion (16) in a state where the connecting operation of the first terminal holding member (21) is started.

7 Claims, 12 Drawing Sheets

(56) References Cited

U.S. PATENT DOCUMENTS

| | | | | |
|---|---|---|---|---|
| 5,913,703 | A * | 6/1999 | Suzuki | H01R 13/641 439/701 |
| 7,686,630 | B2 * | 3/2010 | Takehara | H01R 13/5213 439/140 |
| 10,038,279 | B2 * | 7/2018 | Suzuki | H01R 13/4538 |
| 10,971,851 | B2 | 4/2021 | Miyamura et al. | |
| 11,881,650 | B2 * | 1/2024 | Sundarakrishnamachari | H01R 13/506 |
| 2006/0205264 | A1 * | 9/2006 | Katsuma | H01R 13/4538 439/381 |

FOREIGN PATENT DOCUMENTS

| | | | |
|---|---|---|---|
| JP | 2015-232927 | A | 12/2015 |
| WO | 2013/087272 | A1 | 6/2013 |

* cited by examiner

CONNECTOR HAVING FIRST HOUSING AND SECOND HOUSING CONNECTABLE TO EACH OTHER

CROSS REFERENCE TO RELATED APPLICATIONS

This application is a national phase of PCT application No. PCT/JP2020/031217, filed on 19 Aug. 2020, which claims priority from Japanese patent application No. 2019-158301, filed on 30 Aug. 2019, all of which are incorporated herein by reference.

TECHNICAL FIELD

The present disclosure relates to a connector.

BACKGROUND

Patent Document 1 discloses a connector including a female terminal mounted in a female housing and a male terminal mounted in a male housing. A resiliently deformable contact spring is accommodated in a box portion of the female terminal and the male terminal includes a tab. When the female housing and the male housing are connected, the tab is inserted into the box portion to resiliently deform the contact spring, wherefore the female terminal and the male terminal are connected with a predetermined contact pressure by resilience due to a resilient restoring force of the contact spring.

PRIOR ART DOCUMENT

Patent Document

Patent Document 1: JP 2015-232927 A

SUMMARY OF THE INVENTION

Problems to be Solved

When the tab of the male terminal resiliently deforms the contact spring, a friction resistance due to the resilient restoring force of the contact spring is generated and this friction resistance becomes a connection resistance when the female and male housings are connected. The connection resistance increases as the numbers of the female terminals and the male terminals increase. As a countermeasure against this, in a multi-pole connector, a boosting mechanism using a rotation-type lever is adopted. However, if the rotation-type lever is used, there is a problem that the connector is enlarged by the lever.

A connector of the present disclosure was completed on the basis of the above situation and aims to realize a size reduction.

Means to Solve the Problem

The present disclosure is directed to a connector with a first housing and a second housing connectable to each other, wherein the second housing is configured by assembling a first terminal holding member and a second terminal holding member to be relatively displaceable, the first housing is provided with a restricting portion for allowing a connecting operation of the first terminal holding member and restricting a connecting operation of the second terminal holding member, and the first terminal holding member is provided with a restriction releasing portion for releasing restriction by the restricting portion after the connecting operation of the first terminal holding member is started.

Effect of the Invention

According to the present disclosure, a connector can be reduced in size.

DETAILED DESCRIPTION TO EXECUTE THE INVENTION

Description of Embodiments of Present Disclosure

Figure 1:
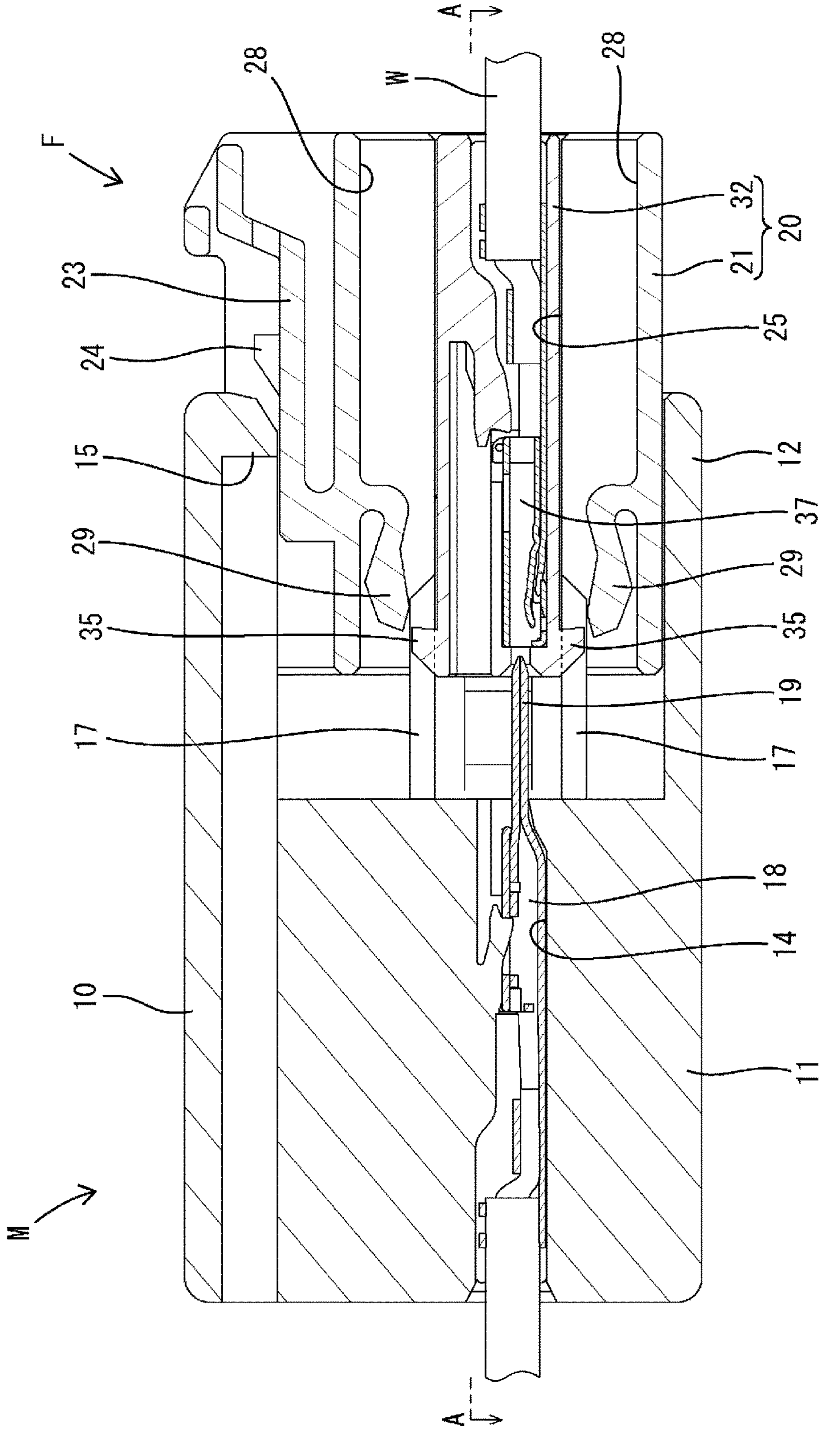
FIG. 1 is a side view in section showing a state where the connection of a first housing and a second housing is started.

First, embodiments of the present disclosure are listed and described.

(1) The connector of the present disclosure includes a first housing and a second housing connectable to each other, wherein the second housing is configured by assembling a first terminal holding member and a second terminal holding member to be relatively displaceable, the first housing is provided with a restricting portion for allowing a connecting operation of the first terminal holding member and restricting a connecting operation of the second terminal holding member, and the first terminal holding member is provided with a restriction releasing portion for releasing restriction by the restricting portion after the connecting operation of the first terminal holding member is started.

According to the configuration of the present disclosure, the connecting operation of the second terminal holding member is restricted by the restricting portion and a connection resistance is generated only between the first housing and the first terminal holding member in the first half of the connection of the first and second housings. The restriction of the connecting operation of the second terminal holding member is released by the restriction releasing portion, the connecting operation of the second terminal holding member is performed and a connection resistance is generated between the first housing and the second terminal holding member in the second half of the connection of the first and second housings. Since a start timing of the connection of the first terminal holding member and that of the connection of the second terminal holding member are different, a peak value of the connection resistance is reduced as compared to the case where the connection of the first terminal holding member and that of the second terminal holding member are simultaneously started. According to the connector of this embodiment, a size reduction can be realized since a boosting mechanism using a lever is not required.

(2) Preferably, the restriction releasing portion is disposed at a position to release the restriction of the restricting portion when the first terminal holding member is properly connected. According to this configuration, the connecting operation of the second terminal holding member can be started when the first terminal holding member is properly connected. According to the present disclosure, the second terminal holding member exhibits a function to detect a connected state of the first terminal holding member.

(3) Preferably, the first terminal holding member is formed with an accommodation space for accommodating the second terminal holding member in a state where the first and second housings are not connected yet. According to this configuration, the interference of external matters with the second terminal holding member can be prevented.

(4) In (3), a rear end part in a connecting direction of the second terminal holding member is preferably disposed to project rearward from the first terminal holding member when the first terminal holding member is connected with the connecting operation of the second terminal holding member restricted. According to this configuration, the second terminal holding member can be connected by pushing the rear end part of the second terminal holding member after the connection of the first terminal holding member, wherefore the connecting operation is easily performed.

(5) Preferably, the first terminal holding member includes a lock arm to be locked to the first housing, a pair of resilient locking pieces disposed to sandwich the second terminal holding member, and a plurality of first terminal accommodation chambers disposed side by side in one direction, the lock arm and the pair of resilient locking pieces are disposed side by side in a row in a direction intersecting an arrangement direction of the plurality of first terminal accommodation chambers, and at least one of the lock arm and the pair of resilient locking pieces is disposed between two adjacent ones of the first terminal accommodation chambers. If the first terminal accommodation chambers are disposed between the lock arm and the resilient locking piece or between the pair of resilient locking pieces, the second housing is enlarged in an arrangement direction of the lock arm and the resilient locking pieces. However, according to the configuration of the present disclosure, the second housing can be reduced in size in the arrangement direction of the lock arm and the resilient locking pieces.

(6) Preferably, the second terminal holding member includes a locking projection to be locked to the first terminal holding member and a projecting portion to be fit into a groove portion of the first terminal holding member only when the second terminal holding member is mounted in a proper orientation with respect to the first terminal holding member, and the projecting portion projects in the same direction as the locking projection from an outer surface of the second terminal holding member. Since the projecting portion projects in the same direction as the locking projection, the second terminal holding member can be reduced in size as compared to the case where the projecting portion and the locking projection project in different directions.

Details of Embodiment of Present Disclosure

One specific embodiment of a connector of the present disclosure is described below with reference to FIGS. 1 to 12. Note that the present invention is not limited to these illustrations and is intended to be represented by claims and include all changes in the scope of claims and in the meaning and scope of equivalents.

A connector of this embodiment includes a male connector M and a female connector F connectable to each other. In this embodiment, a right side in FIGS. 1, 2 and 9 to 12 is defined as a front side concerning a front-rear direction of the male connector M, and a left side in FIGS. 1, 2 and 9 to 12 is defined as a front side, contrary to the male connector M, concerning a front-rear direction of the female connector F. Upper and lower sides shown in FIGS. 1, 3 to 9 and 11 are directly defined as upper and lower sides concerning a vertical direction. Left and right sides shown in FIGS. 3, 4, 7 and 8 are directly defined as left and right sides concerning a lateral direction.

Figure 2:
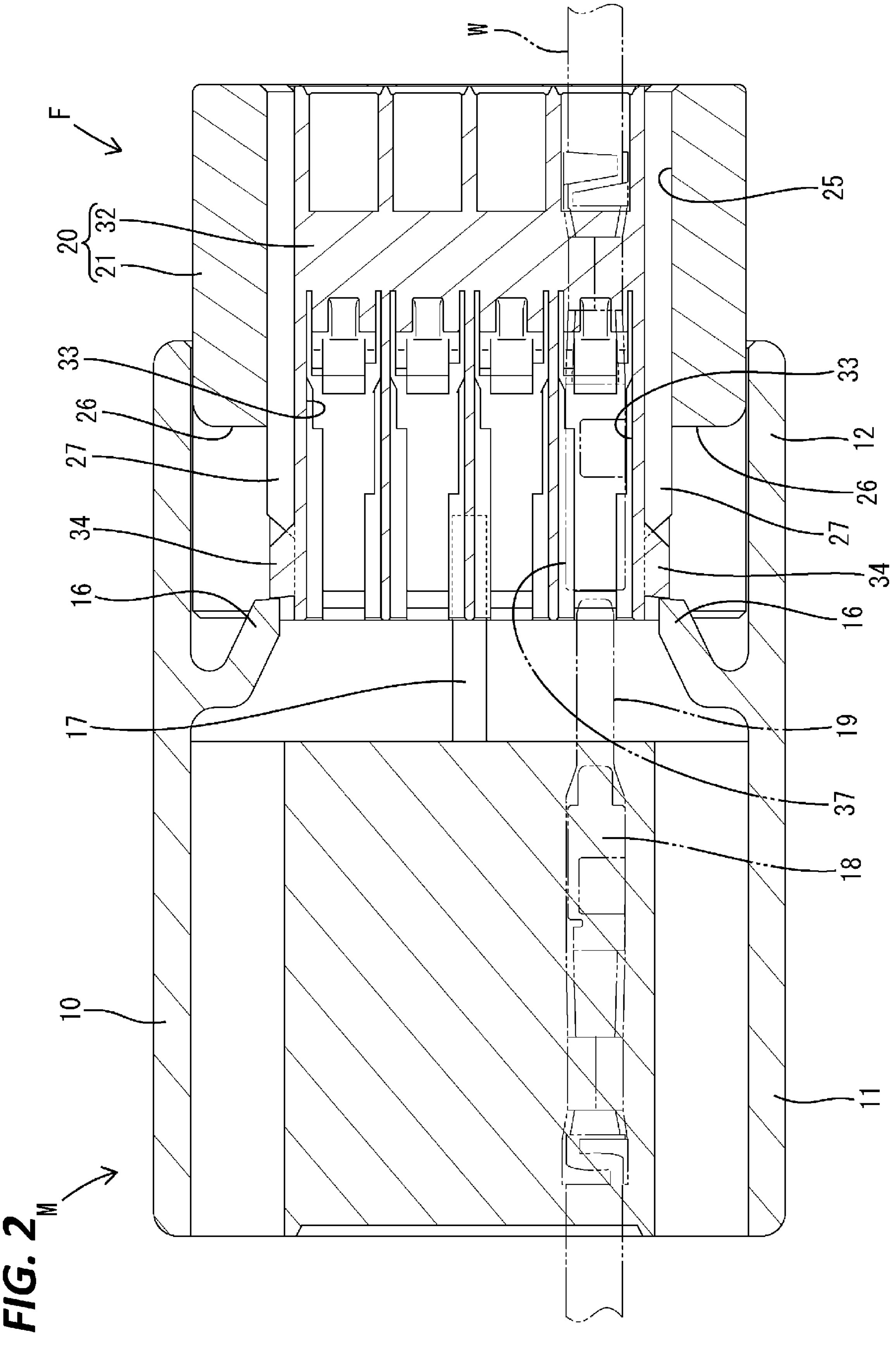
FIG. 2 is a section along A-A of FIG. 1.
Figure 3:
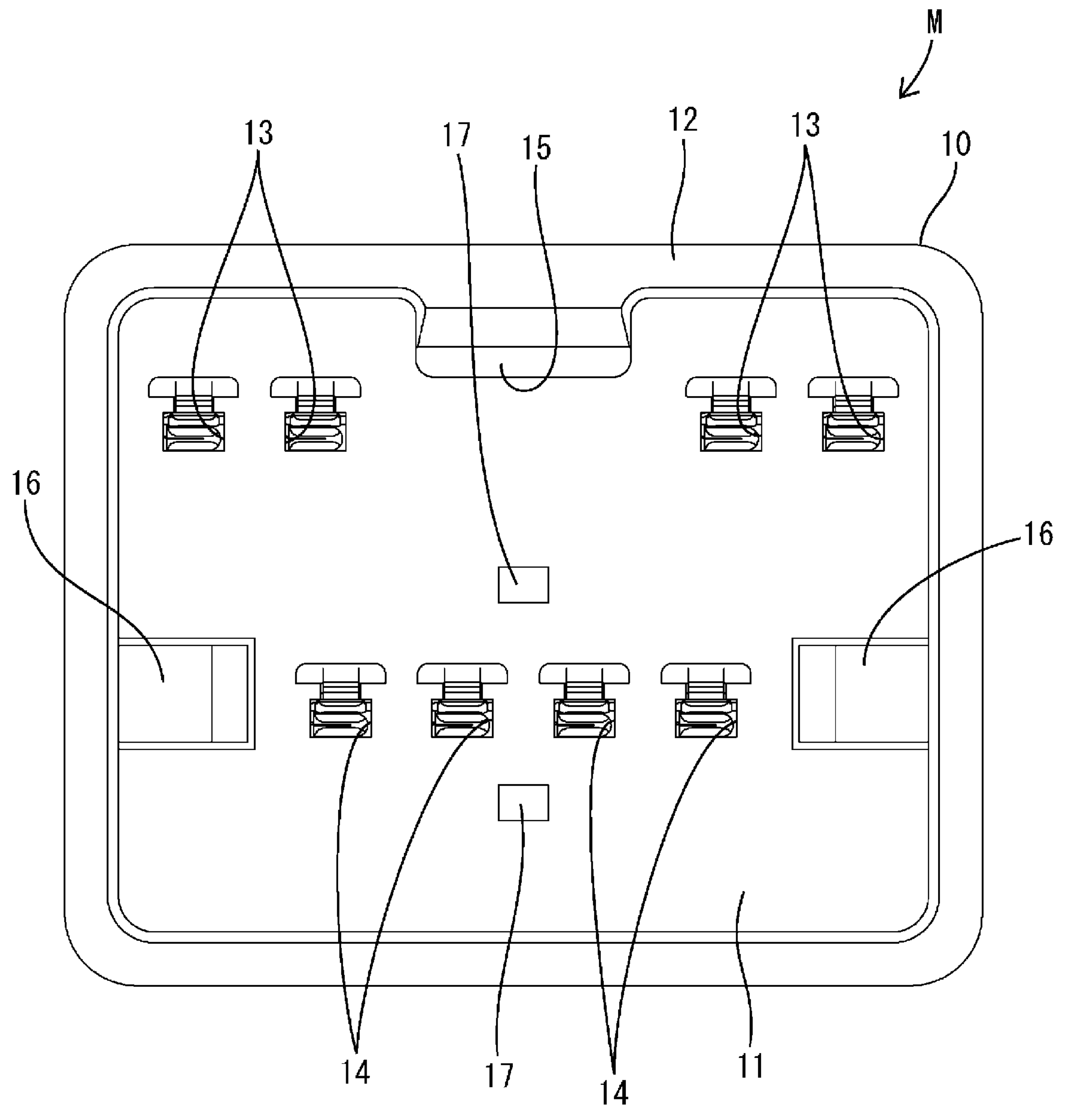
FIG. 3 is a front view of the first housing.

As shown in FIGS. 1 to 3, the male connector M includes a first housing 10 made of synthetic resin and a plurality of male terminal fittings 18 mounted in the first housing 10. The first housing 10 is a single component including a rectangular housing body portion 11 and a receptacle 12 in the form of a rectangular tube projecting forward from the front surface of the housing body portion 11. As shown in FIG. 3, eight cavities 13, 14 are formed in the housing body portion 11. The male terminal fittings 18 fixed to wires W are inserted into the respective cavities 13, 14 from behind the first housing 10. Tabs 19 of the respective male terminal fittings 18 project into a receptacle 12 from the front surface of the housing body portion 11.

Out of the eight cavities 13, 14, four first cavities 13 are laterally arranged side by side in a row at the same height in an upper end part of the housing. The four first cavities 13 are divided into two on a right side and two on a left side, and arranged in both left and right end parts of the housing body portion 11. Out of the eight cavities 13, 14, four second cavities 14 are laterally arranged at fixed intervals in a row at a height lower than a vertical center of the housing body portion 11. An interval between the laterally adjacent second cavities 14 is smaller than a width of one second cavity 14.

As shown in FIGS. 1 and 3, the first housing 10 is formed with a lock portion 15. The lock portion 15 is formed to project downward (inwardly of the receptacle 12) from a front end part of an upper wall part constituting the receptacle 12. The lock portion 15 is disposed in a laterally central part of the receptacle 12. In other words, the lock portion 15 is disposed between a pair of left first cavities 13 and a pair of right first cavities 13 in the lateral direction. Therefore, the four first cavities 13 and the lock portion 15 are laterally disposed side by side in a row at the same height.

As shown in FIGS. 2 and 3, the first housing 10 is integrally formed with a pair of bilaterally symmetrical restricting portions 16. The pair of restricting portions 16 are cantilevered obliquely forward from both left and right end parts of the front surface of the housing body portion 11 (back end surface of the receptacle 12). The pair of restricting portions 16 are disposed to sandwich the four second cavities 14 from left and right sides at the same height as the second cavities 14. Each restricting portion 16 is resiliently deformable in the lateral direction.

As shown in FIGS. 1 and 3, the first housing 10 is formed with a pair of upper and lower unlocking portions 17. The pair of unlocking portions 17 are cantilevered forward from the front end surface of the housing. A projecting direction of the unlocking portions 17 is a direction parallel to a connecting direction of the male and female connectors M, F. The pair of unlocking portions 17 are disposed in a central part of the housing body portion 11 in the lateral direction and separately disposed above and below the second cavities 14 in the vertical direction.

Figure 4:
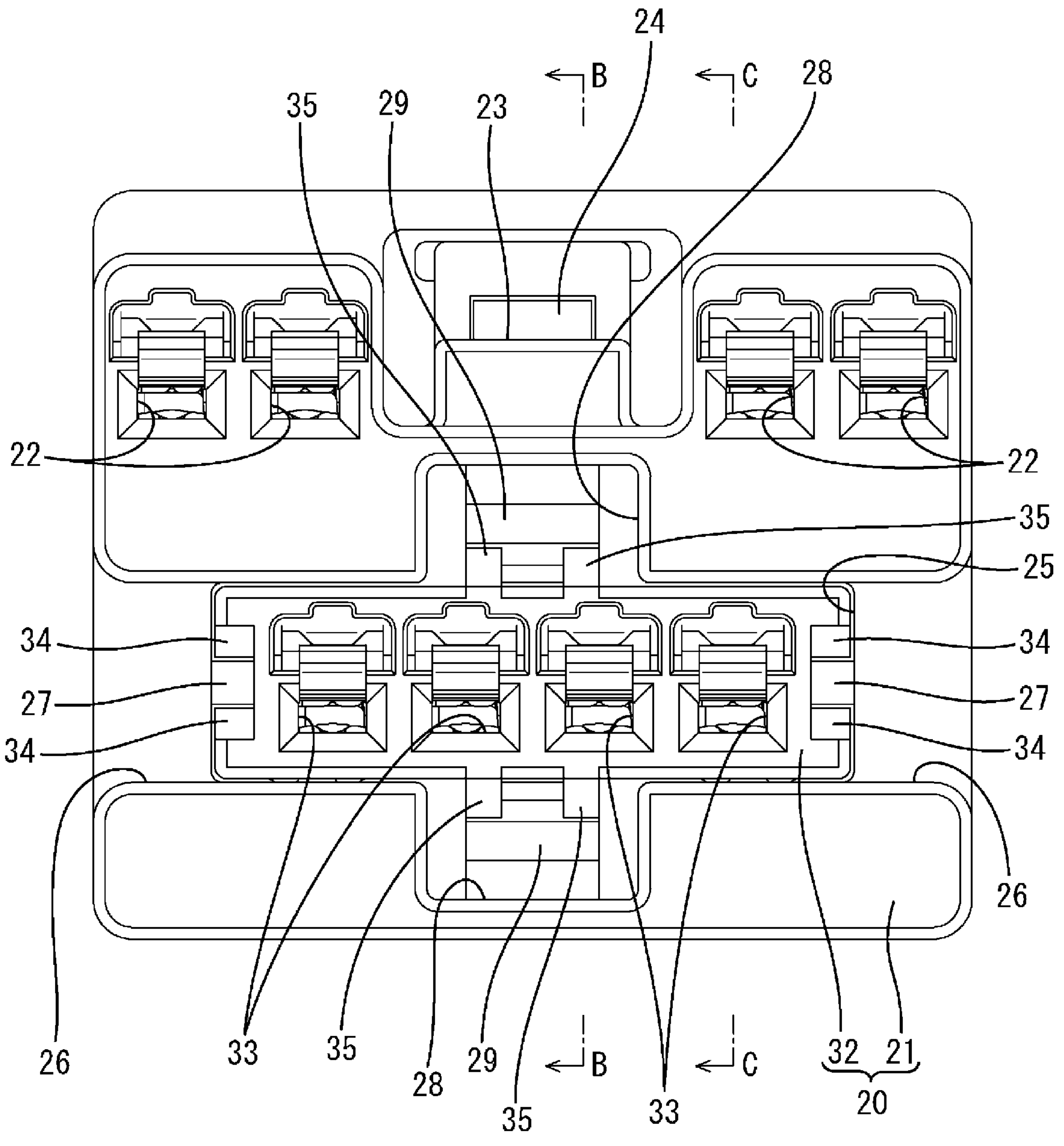
FIG. 4 is a front view of the second housing.
Figure 5:
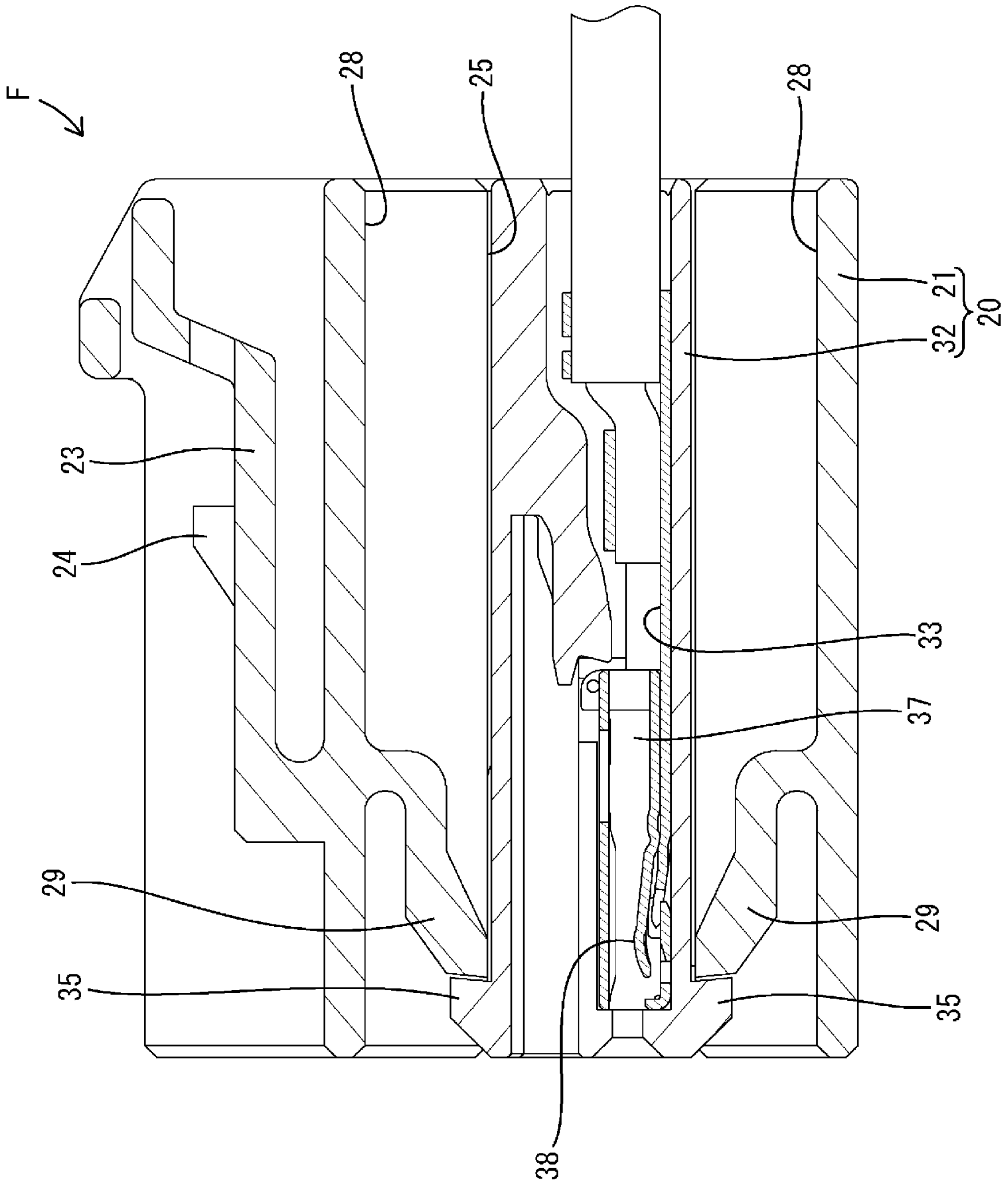
FIG. 5 is a section along B-B of FIG. 4.
Figure 6:
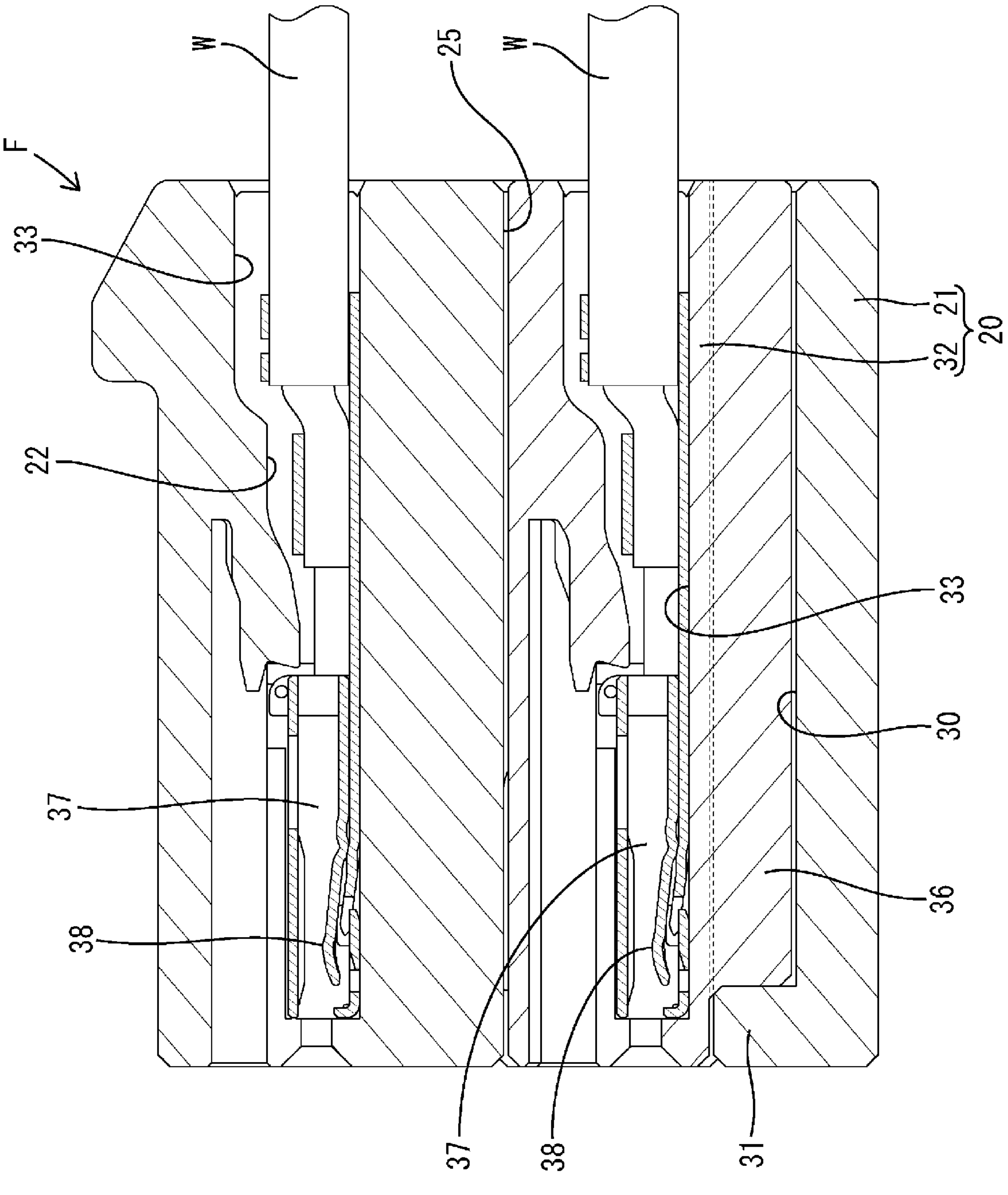
FIG. 6 is a section along C-C of FIG. 4.

As shown in FIGS. 4 to 6, the female connector F includes a second housing 20 and eight female terminal fittings 37 mounted in the second housing 20. The second housing 20 is configured by assembling a first terminal holding member 21 made of synthetic resin and a second terminal holding member 32 made of synthetic resin, which is a component separate from the first terminal holding member 21.

Figure 7:
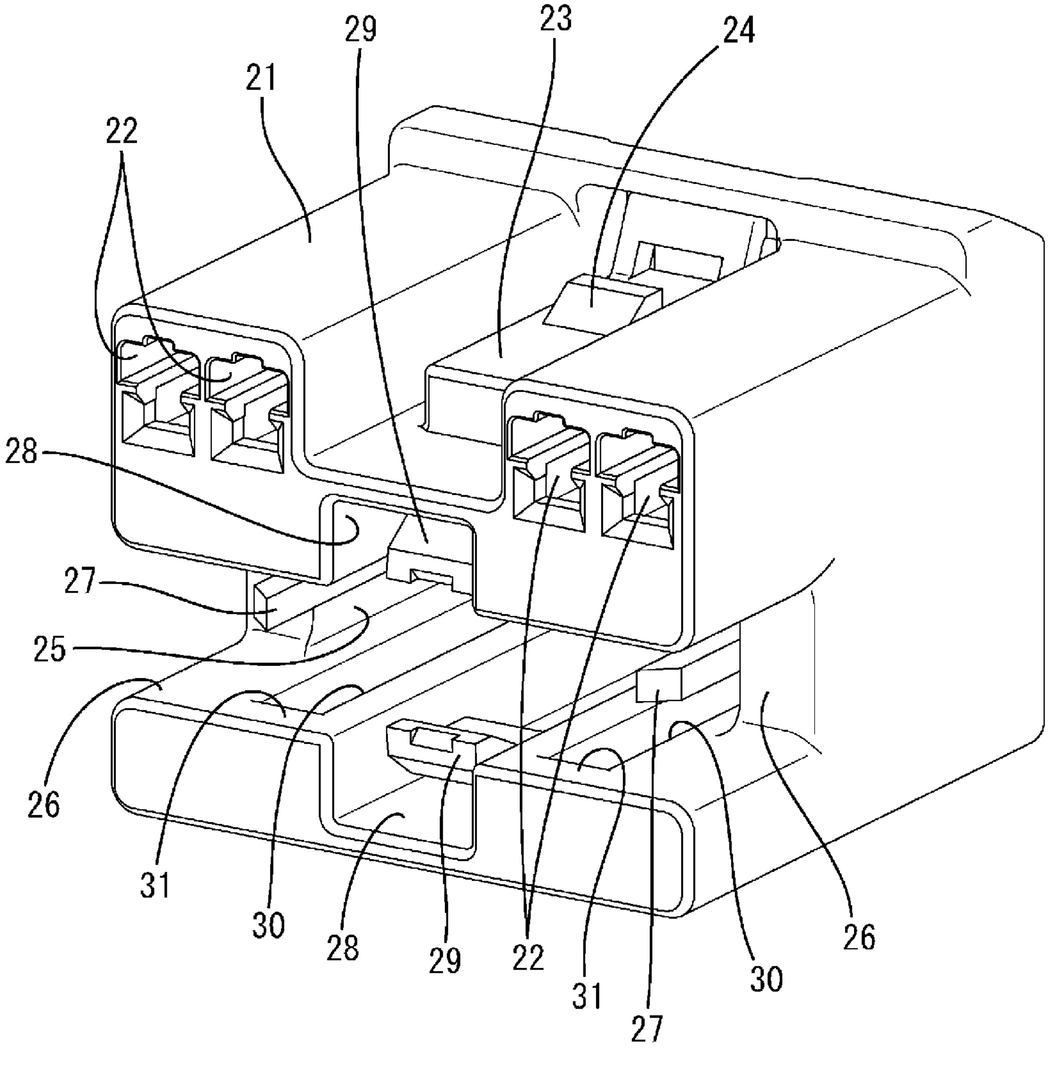
FIG. 7 is a perspective view of a first terminal holding member.

The first terminal holding member 21 is a single component. As shown in FIGS. 4 and 7, the first terminal holding member 21 is formed with four first terminal accommodation chambers 22. The first terminal accommodation chambers 22 are laterally arranged side by side in a row at the same height in an upper end part of the first terminal holding member 21. The four first terminal accommodation chambers 22 are divided into two on a left side and two on a right side, and arranged in both left and right parts of the first terminal holding member 21. With the male and female connectors M, F connected, the four first terminal accommodation chambers 22 and the four first cavities 13 are positioned to individually face each other in the front-rear direction. As shown in FIG. 6, the female terminal fitting 37 fixed to a wire W is inserted into each first terminal accommodation chamber 22 from behind the first terminal holding member 21. The female terminal fitting 37 includes a resiliently deformable resilient contact piece 38.

As shown in FIGS. 5 and 7, the first terminal holding member 21 is formed with a lock arm 23 for locking the male and female connectors M, F in a connected state. The lock arm 23 is cantilevered rearward and is resiliently deformable in the vertical direction (direction intersecting the connecting direction of the male and female connectors M, F). A lock projection 24 lockable to the lock portion 15 is formed on the upper surface of the lock arm 23.

As shown in FIG. 4, the lock arm 23 is disposed in a laterally central part of the first terminal holding member 21 at the same height as the first terminal accommodation chambers 22. In other words, the lock arm 23 is disposed between a pair of first terminal accommodation chambers 22 on a left side and a pair of first terminal accommodation chambers 22 on a right side in the lateral direction. Therefore, the four first terminal accommodation chambers 22 and the lock arm 23 are laterally disposed side by side in a row at the same height.

As shown in FIGS. 4 to 6, the first terminal holding member 21 is formed with an accommodation space 25 penetrating through the first terminal holding member 21 in the front-rear direction. The accommodation space 25 is a space having a laterally long rectangular shape in a front view, and disposed below the four first terminal accommodation chambers 22. With the male and female connectors M, F connected, the accommodation space 25 is positioned to face the four second cavities 14.

As shown in FIGS. 2, 4 and 7, the first terminal holding member 21 is formed with a pair of bilaterally symmetrical escaping recesses 26. The pair of escaping recesses 26 are formed by cutting regions of front end parts of both left and right outer wall parts of the first terminal holding member 21 where the accommodation space 25 is formed in the vertical direction. A front end part of the internal space of the accommodation space 25 is open in outer side surfaces of the first terminal holding member 21 via the escaping recesses 26.

The first terminal holding member 21 is integrally formed with a pair of bilaterally symmetrical restriction releasing portions 27. The pair of restriction releasing portions 27 are elongated in the front-rear direction and disposed in both left and right end parts of the accommodation space 25. Rear end regions of the restriction releasing portions 27 are in the form of ribs connected to the accommodation space 25 and projecting from both left and right inner side surfaces of the accommodation space 25. Front end regions of the restriction releasing portions 27 are cantilevered forward from the inner side surfaces of the accommodation space 25 and disposed to face the escaping recesses 26.

As shown in FIGS. 4, 5 and 7, the first terminal holding member 21 is formed with a pair of vertically symmetrical mold removal spaces 28 penetrating through the first terminal holding member 21 in the front-rear direction (direction parallel to the connecting direction of the male and female connectors M, F). As shown in FIG. 4, the pair of mold removal spaces 28 are disposed in the laterally central part of the first terminal holding member 21. In other words, the mold removal spaces 28 are disposed at the same position as the lock arm 23 in the lateral direction. Lateral dimensions of the pair of mold removal spaces 28 are smaller than that of the accommodation space 25. As shown in FIG. 5, each of the pair of mold removal spaces 28 communicates with the accommodation space 25 over the entire length from the front end to the rear end thereof.

As shown in FIGS. 4, 5 and 7, a pair of vertically symmetrical resilient locking pieces 29 are individually provided in the pair of mold removal spaces 28. The resilient locking piece 29 is cantilevered obliquely forward from an inner surface of the mold removal space 28 on a side opposite to the accommodation space 25, and integrally formed to the first terminal holding member 21. The resilient locking piece 29 is resiliently deformable in the vertical direction (direction intersecting the connecting direction of the male and female connectors M, F).

As shown in FIGS. 6 and 7, the first terminal holding member 21 is formed with a pair of bilaterally symmetrical groove portions 30. The groove portion 30 is elongated in the front-rear direction. A front end part of the groove portion 30 functions as a front stop portion 31. The rear end of the groove portion 30 is open in the rear end surface of the first terminal holding member 21. The groove portion 30 is open in the lower surface of the accommodation space 25 on a side opposite to the first terminal accommodation chambers 22 in the vertical direction, out of both upper and lower surfaces of the accommodation space 25. In the lateral direction, the groove portion 30 is disposed between the inner side surface of the accommodation space 25 and the lower mold removal space 28.

Figure 8:
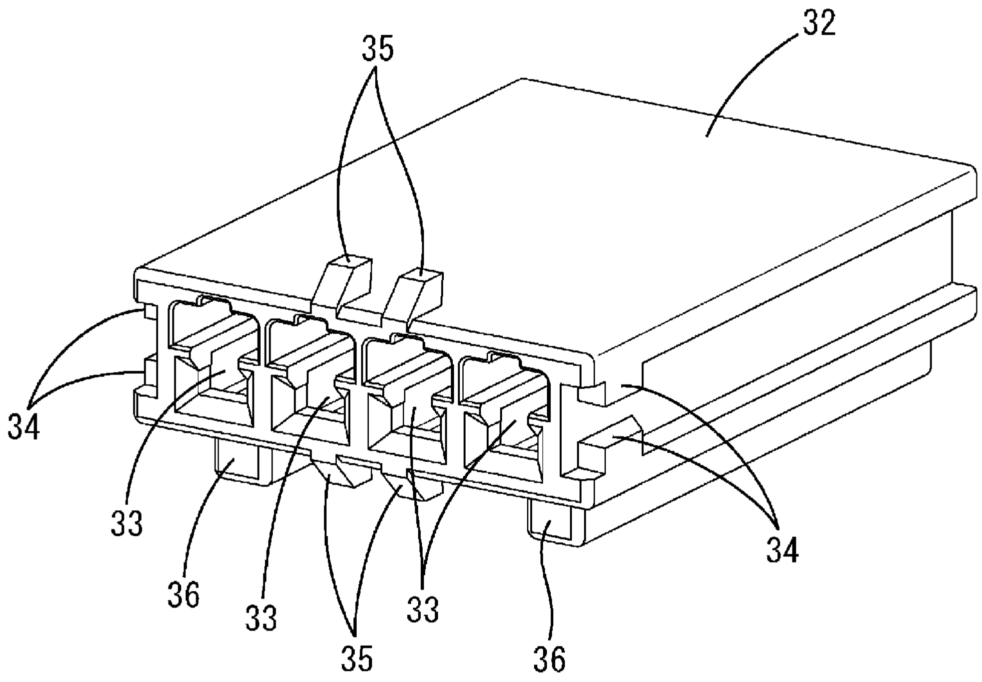
FIG. 8 is a perspective view of a second terminal holding member.

The second terminal holding member 32 is a single component made of synthetic resin. As shown in FIG. 8, the second terminal holding member 32 has a rectangular shape having a height smaller than dimensions in the front-rear direction and lateral direction. As shown in FIGS. 4 and 8, the second terminal holding member 32 is formed with four second terminal accommodation chambers 33 elongated in the front-rear direction. The four second terminal accommodation chambers 33 are laterally arranged side by side at fixed intervals. With the male and female connectors M, F connected, the four terminal accommodation chambers and the four second cavities 14 are positioned to individually face each other in the front-rear direction. The female terminal fitting 37 fixed to a wire W is inserted into each second terminal accommodation chamber 33 from behind the second terminal holding member 32.

As shown in FIGS. 4 and 8, two restricting projections 34 disposed at an interval in the vertical direction are formed on each of left and right outer side surfaces of the second terminal holding member 32. The restricting projections 34 are disposed in a front end part of the second terminal holding member 32. Before the first and second housings 10, 20 are connected, one restricting portion 16 of the first housing 10 faces the two restricting projections 34 arranged in the vertical direction and butts against these two restricting projections 34. In the process of assembling the second terminal holding member 32 with the first terminal holding member 21 and connecting the first and second housings 10, 20, one restriction releasing portion 27 of the first terminal holding member 21 enters between the two restricting projections 34 and is relatively displaced in the front-rear direction.

As shown in FIGS. 4 and 8, two locking projections 35 disposed side by side at an interval in the lateral direction are formed on each of the upper and lower surfaces of the second terminal holding member 32. The locking projections 35 are disposed in the front end part of the second terminal holding member 32. With the second terminal holding member 32 assembled with the first terminal holding member 21, one resilient locking piece 29 of the first terminal holding member 21 can contact the two laterally arranged locking projections 35 from behind. In the process of connecting the first and second housings 10, 20, one unlocking portion 17 of the first housing 10 enters between the two laterally arranged locking projections 35 and is relatively displaceable in the front-rear direction.

As shown in FIGS. 6 and 8, the second terminal holding member 32 is formed with a pair of bilaterally symmetrical projecting portions 36. The pair of projecting portions 36 have a shape elongated in the front-rear direction (direction parallel to the connecting direction of the first and second housings 10, 20) and project from the lower surface of the second terminal holding member 32. A projecting direction of the pair of projecting portions 36 from the second terminal holding member 32 is the same direction as the projecting direction of the two left and right locking projections 35 on a lower side.

In assembling the first and second terminal holding members 21, 32, the second terminal holding member 32 is inserted into the accommodation space 25 of the first terminal holding member 21 and the pair of projecting portions 36 are inserted into the pair of groove portions 30. With the first and second terminal holding members 21, 32 assembled, the front ends of the pair of projecting portions 36 are in contact with the front stop portions 31 on the front ends of the groove portions 30 as shown in FIG. 6, thereby restricting a forward relative displacement of the second terminal holding member 32 with respect to the first terminal holding member 21.

Further, as shown in FIG. 5, the pair of upper and lower resilient locking pieces 29 are locked to the locking projections 35 from behind, thereby restricting a rearward relative displacement of the second terminal holding member 32 with respect to the first terminal holding member 21. When the resilient locking pieces 29 are resiliently deformed to be disengaged from the locking projections 35, the second terminal holding member 32 is relatively movable rearward (direction parallel to the connecting direction of the first and second housings 10, 20) with respect to the first terminal holding member 21 while sliding in contact with the inner surface of the accommodation space 25. In other words, the first terminal holding member 21 becomes relatively movable forward with respect to the second terminal holding member 32 by the disengagement of the resilient locking pieces 29 from the locking projections 35.

When the second terminal holding member 32 is mounted into the first terminal holding member 21 as described above, the assembling of the second housing 20 is completed. As shown in FIGS. 5 and 6, with the both terminal holding members 21, 32 assembled, the front end part of the second terminal holding member 32 does not project from the front end surface of the first terminal holding member 21 and a rear end of the second terminal holding member 32 does not project from the rear end surface of the first terminal holding member 21. That is, the second terminal holding member 32 is entirely accommodated in the accommodation space 25 (in the first terminal holding member 21). The front end surface of the second terminal holding member 32 is exposed in flush with the front end surface of the first terminal holding member 21, and the rear end surface of the second terminal holding member 32 is exposed in flush with the rear end surface of the first terminal holding member 21. As shown in FIG. 2, the both left and right outer side surfaces and the restricting projections 34 in the front end part of the second terminal holding member 32 are exposed on the outer side surfaces of the first terminal holding member 21 in the escaping recesses 26.

In assembling the first and second housings 10, 20, the first terminal holding member 21 is pinched and the second housing 20 is inserted into the receptacle 12. During insertion, each unlocking portion 17 of the first housing 10 enters between the two laterally arranged locking projections 35 to resiliently deform the resilient locking piece 29 in a direction away from the second terminal holding member 32 as shown in FIG. 1 in a state where the tab 19 of none of the male terminal fittings 18 is in contact with the female terminal fitting 37. The resiliently deformed resilient locking pieces 29 are disengaged from the locking projections 35. When the resilient locking pieces 29 are disengaged from the locking projections 35, the first terminal holding member 21 becomes relatively displaceable forward with respect to the second terminal holding member 32.

Immediately after the resilient locking pieces 29 are disengaged from the locking projections 35, the restricting projections 34 of the second housing 20 butt against the restricting portions 16 of the first housing 10 as shown in FIG. 2, wherefore a connecting operation of the second terminal holding member 32 to the first housing 10 is restricted. Therefore, at the time of the connecting operation, if the first terminal holding member 21 is pushed toward the first housing 10 while being pinched, only the first terminal holding member 21 enters the receptacle 12 with the second terminal holding member 32 stopped.

As the first terminal holding member 21 is connected, the resilient contact pieces 38 of the female terminal fittings 37 mounted in the first terminal holding member 21 resiliently contact the tabs 19 of the male terminal fittings 18. In this way, a connection resistance due to friction between the resilient contact pieces 38 and the tabs 19 is generated between the first terminal holding member 21 and the first housing 10. This connection resistance due to resilient contact between the female terminal fittings 37 of the first terminal holding member 21 and the male terminal fittings 18 is maximized (peaked) when the contact of the tabs 19 and the resilient contact pieces 38 is started and the connection resistance thereafter transitions at a relatively low value.

Figure 9:
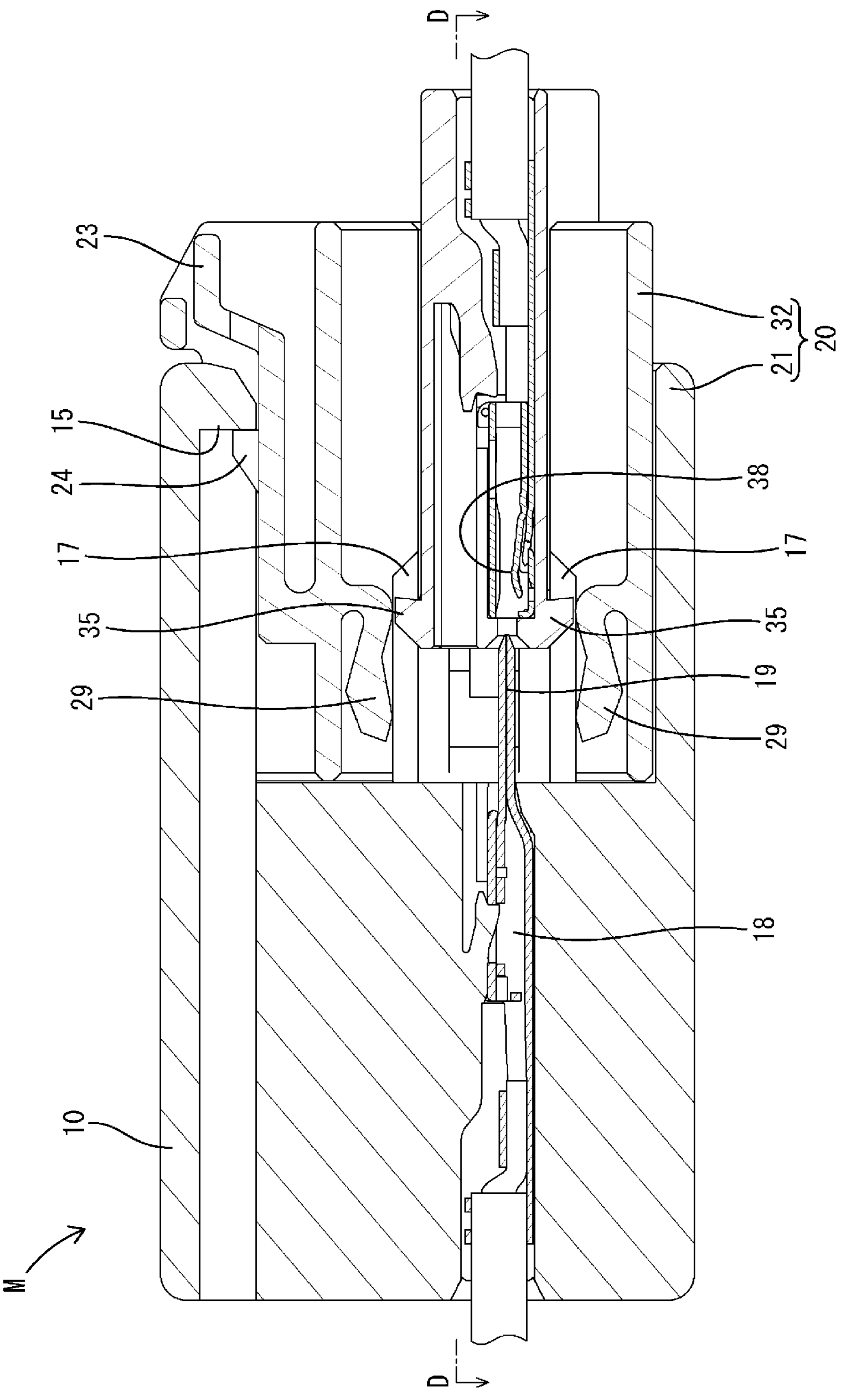
FIG. 9 is a side view in section showing a state where only the first terminal holding member is properly connected in the process of connecting the first and second housings.

When the first terminal holding member 21 comes into contact with the back end surface of the receptacle 12, the first terminal holding member 21 and the first housing 10 are properly connected as shown in FIG. 9. In a properly connected state, the lock projection 24 of the lock arm 23 is locked to the lock portion 15 of the first housing 10, whereby the first terminal holding member 21 and the first housing 10 is locked in a separation restricted state. Further, since the connecting operation of the second terminal holding member 32 remains to be restricted, the rear end part of the second terminal holding member 32 projects rearward from the first terminal holding member 21.

Figure 10:
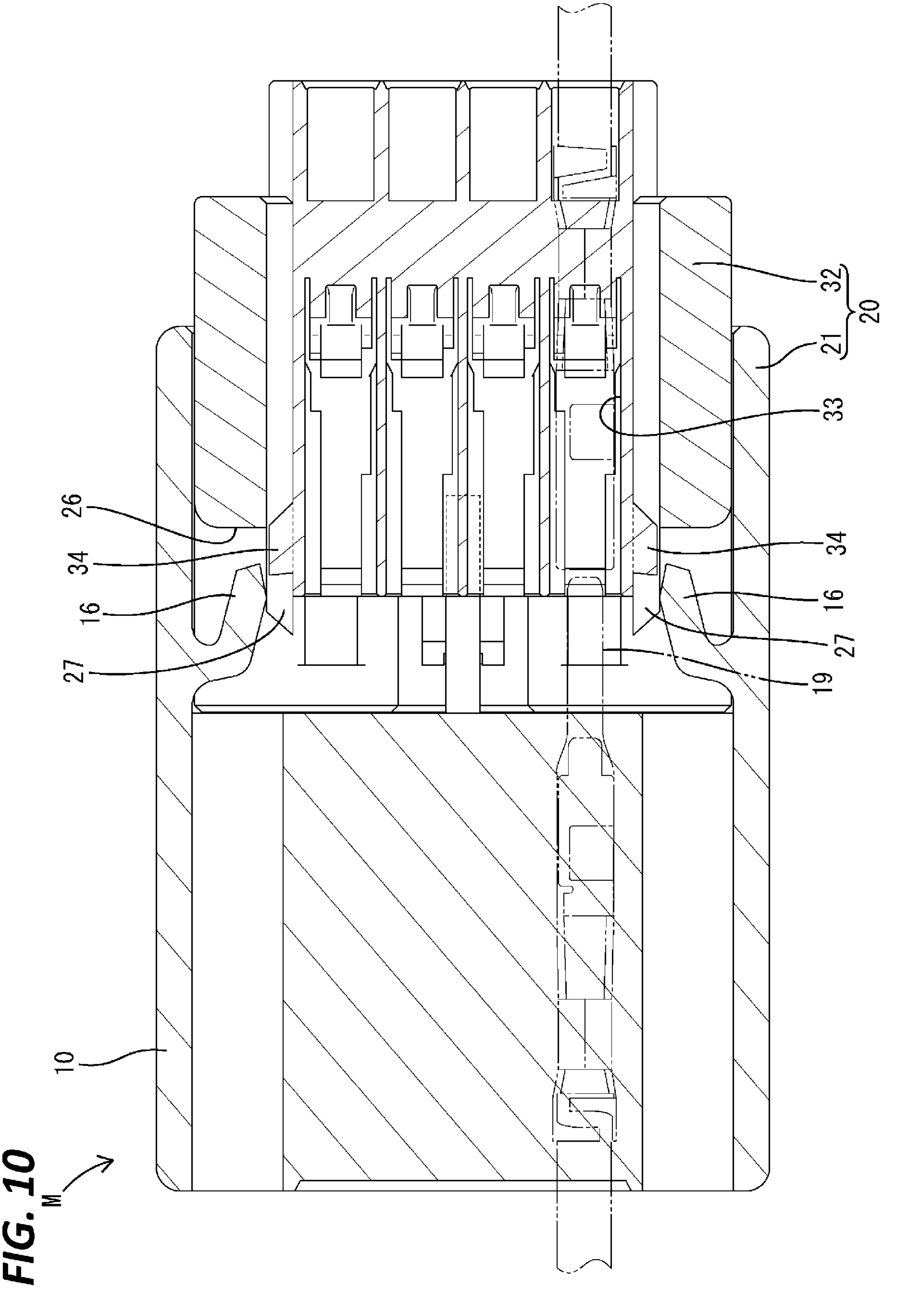
FIG. 10 is a section along D-D of FIG. 9.

When the first terminal holding member 21 is properly connected, the restriction releasing portions 27 of the first terminal holding member 21 resiliently deform the restricting portions 16 of the first housing 10 as shown in FIG. 10, wherefore the restricting portions 16 are disengaged from the restricting projections 34. When the restricting portions 16 are disengaged from the restricting projections 34, restriction by the restricting portions 16 is released and the connecting operation of the second terminal holding member 32 to the first housing 10 is allowed. Therefore, a worker can start the connection of the second terminal holding member 32 by releasing fingers from the first terminal holding member 21 and pushing the rear end part of the second terminal holding member 32 toward the first housing 10. The restriction of the restricting portions 16 is released at a timing after a peak of the connection resistance of the first terminal holding member 21.

When the connection of the second terminal holding member 32 is started, the resilient contact pieces 38 of the female terminal fittings 37 mounted in the second terminal holding member 32 resiliently contact the tabs 19 of the male terminal fittings 18. In this way, a connection resistance due to friction between the resilient contact pieces 38 and the tabs 19 is generated between the second terminal holding member 32 and the first housing 10. Since the number of the female terminal fittings 37 mounted in the second terminal holding member 32 and the number of the female terminal fittings 37 mounted in the first terminal holding member 21 are equal, a maximum value of the connection resistance generated at the time of connecting the second terminal holding member 32 is equal to that of the connection resistance generated at the time of connecting the first terminal holding member 21.

Figure 11:
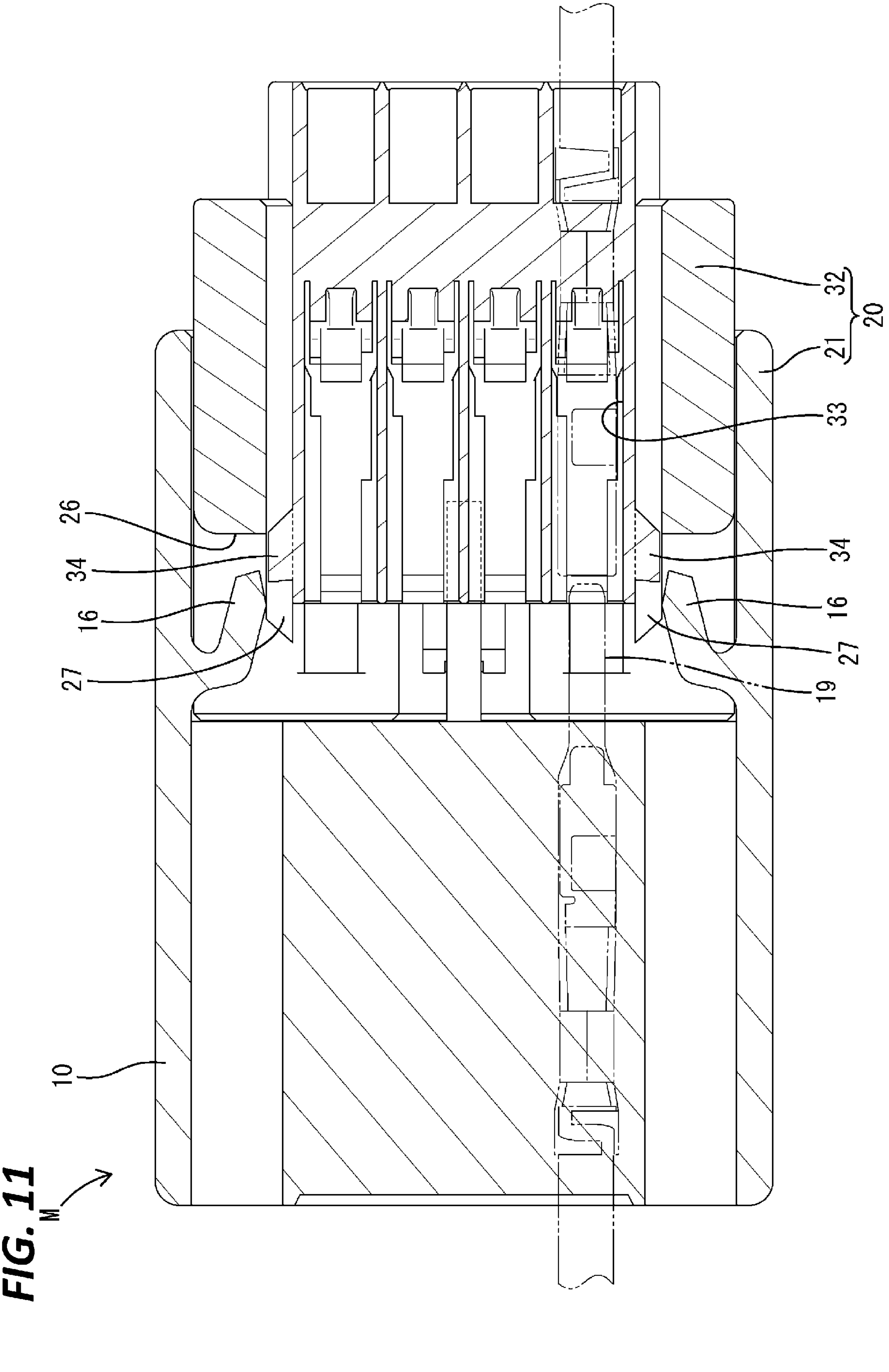
FIG. 11 is a side view in section showing a state where the first and second housings are properly connected.
Figure 12:
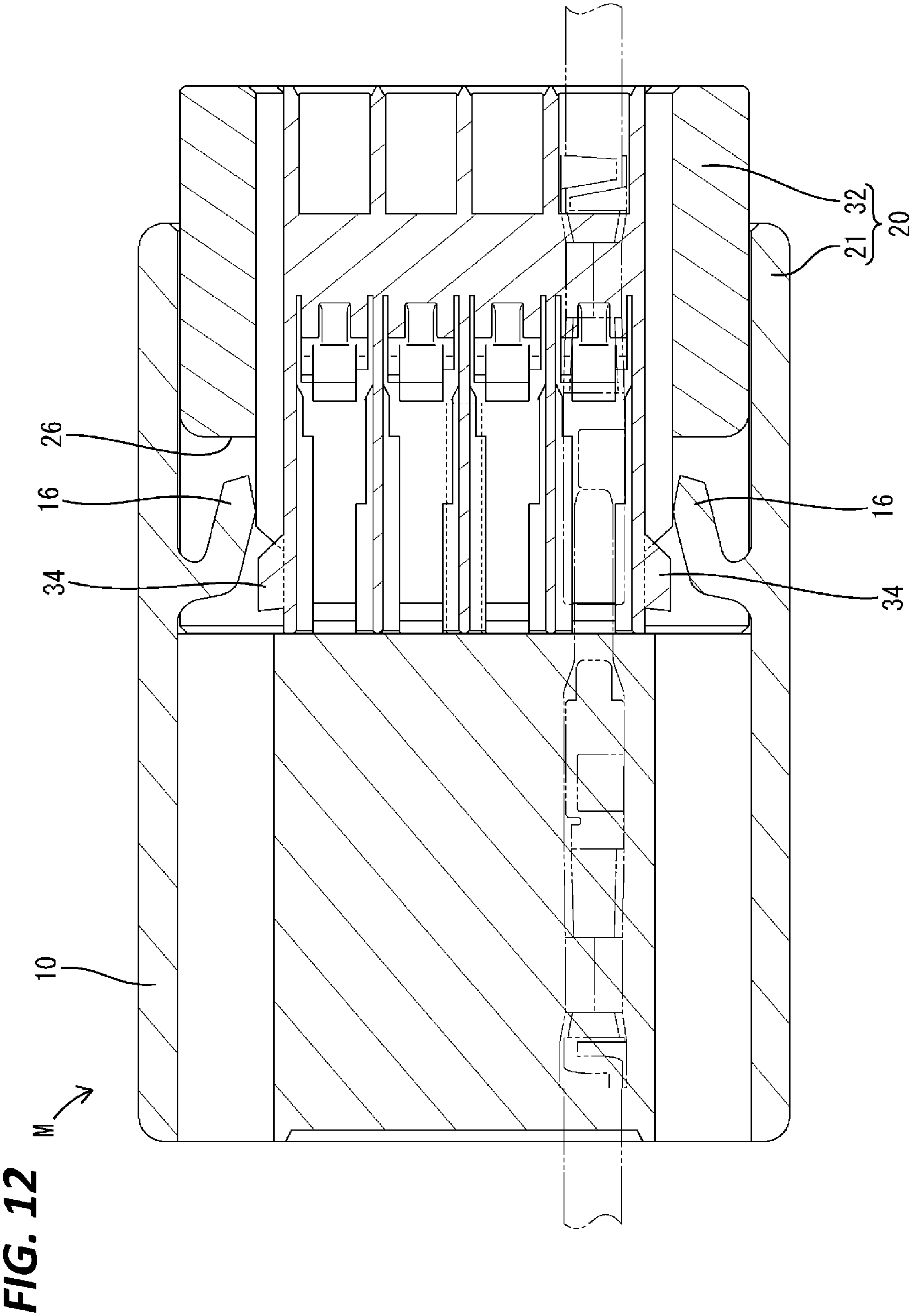
FIG. 12 is a section along E-E of FIG. 11.

This connection resistance due to resilient contact between the female terminal fittings 37 of the second terminal holding member 32 and the male terminal fittings 18 is maximized (peaked) when the contact of the tabs 19 and the resilient contact pieces 38 is started. However, at this point of time, the peak of the connection resistance generated between the female terminal fittings 27 of the first terminal holding member 21 and the male terminal fittings 18 has been already passed. As shown in FIGS. 11 and 12, when the second terminal holding member 32 comes into contact with the back end surface of the receptacle 12, the connection of the second terminal holding member 32 is completed and the connection of the first housing 10 and the second housing 20 is completed.

As described above, the connecting operation of the second terminal holding member 32 is enabled when the first terminal holding member 21 reaches the properly connected state. In an incompletely connected state where the first terminal holding member 21 is not properly connected, the restricting portions 16 remain to be locked to the restricting projections 34 since the restricting portions 16 are not resiliently deformed by the restriction releasing portions 27 or the amount of resilient deformation of the restricting portions 16 is small. That is, the connecting operation of the second terminal holding member 32 remains to be restricted and the connection of the second terminal holding member 32 cannot be started even if the rear end part of the second terminal holding member 32 is pushed. Therefore, the connected state of the first terminal holding member 21 can be detected based on whether or not the second terminal holding member 32 can be connected.

The connector of this embodiment includes the first housing 10 and the second housing 20 connectable to each other. The second housing 20 is configured by assembling the first and second terminal holding members 21, 32 to be relatively displaceable. A relative displacing direction of the first and second terminal holding members 21, 32 is a direction parallel to the connecting direction of the first and second housings 10, 20. The first housing 10 is provided with the restricting portions 16 for allowing the connecting operation of the first terminal holding member 21 and restricting the connecting operation of the second terminal holding member 32. The first terminal holding member 21 is provided with the restriction releasing portions 27 for releasing restriction by the restricting portions 16 in the state where the connecting operation of the first terminal holding member 21 is started (state where the first terminal holding member 21 is properly connected).

According to this configuration, the connecting operation of the second terminal holding member 32 is restricted by the restricting portions 16 and the connection resistance is generated only between the first housing 10 and the first terminal holding member 21 in the first half of the connection of the first and second housings 10, 20. The restriction of the connecting operation of the second terminal holding member 32 is released by the restriction releasing portions 27, the connecting operation of the second terminal holding member 32 is performed and the connection resistance is generated between the first housing 10 and the second terminal holding member 32 in the second half of the connection of the first and second housings 10, 20.

In the connector of this embodiment, the start timing of the connection of the first terminal holding member 21 and the start timing of the connection of the second terminal holding member 32 (i.e. timing at which the connection resistance is maximized) in the connection process are different. Therefore, a peak value (maximum value) of the connection resistance is reduced in the connector of this embodiment as compared to the case where the connection of the first terminal holding member 21 and that of the second terminal holding member 32 are simultaneously started. The connector of this embodiment can be reduced in size since a boosting mechanism using a lever is not required.

The restriction releasing portions 27 are disposed at positions to release the restriction of the restricting portions 16 when the first terminal holding member 21 is properly connected. According to this configuration, the connecting operation of the second terminal holding member 32 can be started when the first terminal holding member 21 is properly connected. That is, the second terminal holding member 32 exhibits a function to detect the connected state of the first terminal holding member 21.

The first terminal holding member 21 is formed with the accommodation space 25 for accommodating the second terminal holding member 32 in a state where the first and second housings 10, 20 are not connected yet. According to this configuration, the interference of external matters with the second terminal holding member 32 can be prevented. Further, when the first terminal holding member 21 is connected with the connecting operation of the second terminal holding member 32 restricted, the rear end part of the second terminal holding member 32 is disposed to project rearward from the first terminal holding member 21.

According to this configuration, after the first terminal holding member 21 is connected, the second terminal holding member 32 can be connected by pushing the rear end part of the second terminal holding member 32. Therefore, the connecting operation is easily performed.

The first terminal holding member 21 includes the lock arm 23 to be locked to the first housing 10, the pair of resilient locking pieces 29 disposed to sandwich the second terminal holding member 32 and the plurality of first terminal accommodation chambers 22 disposed side by side in one direction. The lock arm 23 and the pair of resilient locking pieces 29 are disposed side by side in a row in the vertical direction intersecting an arrangement direction (lateral direction) of the plurality of first terminal accommodation chambers 22.

In such a first terminal holding member 21, the second housing 20 is enlarged in an arrangement direction (vertical direction) of the lock arm 23 and the resilient locking pieces 29 if the first terminal accommodation chambers 22 are disposed between the lock arm 23 and the resilient locking piece 29 or between the pair of resilient locking pieces 29. Accordingly, in the connector of this embodiment, at least one (lock arm 23) of the lock arm 23 and the pair of resilient locking pieces 29 is disposed between two adjacent ones of the first terminal accommodation chambers 22. According to this configuration, the second housing 20 can be reduced in size in the arrangement direction (vertical direction) of the lock arm 23 and the resilient locking pieces 29.

The second terminal holding member 32 includes the locking projections 35 to be locked to the resilient locking pieces 29 of the first terminal holding member 21. Similarly, the second terminal holding member 32 includes the projecting portions 36 to be fit into the groove portions 30 of the first terminal holding member 21 only when the second terminal holding member 32 is mounted in a proper orientation with respect to the first terminal holding member 21. The projecting portions 36 project in the same direction (downward) as the lower locking projections 35 from the outer surface of the second terminal holding member 32. Since the projecting portions 36 project in the same direction as the locking projections 35 in the connector of this embodiment, the second terminal holding member 32 can be reduced in size as compared to the case where the projecting portions 36 and the locking projections 35 project in different directions.

Other Embodiments

The present invention is not limited to the above described and illustrated embodiment and is represented by claims. The present invention is intended to include all changes in the scope of claims and in the meaning and scope of equivalents and also include the following embodiments.

Although the restricting portions are integrally formed to the first housing in the above embodiment, the restricting portions may be components separate from the first housing.

Although the restriction releasing portions are integrally formed to the first terminal holding member in the above embodiment, the restriction releasing portions may be components separate from the first terminal holding member.

Although restriction by the restricting portions is released when the first terminal holding member is properly connected in the above embodiment, restriction by the restricting portions may be released before the first terminal holding member is properly connected. In this case, restriction by the restricting portion is preferably released at a timing after the peak of the connection resistance of the first terminal holding member.

Although the second terminal holding member is entirely accommodated in the first terminal holding member in the state where the first and second housings are not connected yet in the above embodiment, the second terminal holding member may be only partially accommodated in the first terminal holding member or may be entirely exposed to the outside of the first terminal holding member in the state where the both housings are not connected yet.

Although the second terminal holding member is accommodated in the first terminal holding member in the state where the first and second housings are not connected yet in the above embodiment, the first terminal holding member may be at least partially accommodated in the second terminal holding member in the state where the both housings are not connected yet.

Although the number of poles (number of male terminal fittings/female terminal fittings) is eight in the above embodiment, the present invention can be applied also when the number of poles is seven or less or nine or more.

LIST OF REFERENCE NUMERALS

10 . . . first housing
11 . . . housing body portion
12 . . . receptacle
13 . . . first cavity
14 . . . second cavity
15 . . . lock portion
16 . . . restricting portion
17 . . . unlocking portion
18 . . . male terminal fitting
19 . . . tab
20 . . . second housing
21 . . . first terminal holding member
22 . . . first terminal accommodation chamber
23 . . . lock arm
24 . . . lock projection
25 . . . accommodation space
26 . . . escaping recess
27 . . . restriction releasing portion
28 . . . mold removal space
29 . . . resilient locking piece
30 . . . groove portion
31 . . . front stop portion
32 . . . second terminal holding member
33 . . . second terminal accommodation chamber
34 . . . restricting projection
35 . . . locking projection
36 . . . projecting portion
37 . . . female terminal fitting
38 . . . resilient contact piece
F . . . female connector
M . . . male connector
W . . . wire

What is claimed is:

1. A connector, comprising a first housing and a second housing connectable to each other, wherein:

the second housing is configured by assembling a first terminal holding member and a second terminal holding member to be relatively displaceable, the first housing is provided with a restricting portion for allowing a connecting operation of the first terminal holding member and restricting a connecting operation of the second terminal holding member, the restricting portion including a surface for engaging with the second terminal holding member so that the connecting operation of the second terminal holding member is restricted, and the first terminal holding member is provided with a restriction releasing portion for releasing restriction by the restricting portion in a state where the connecting operation of the first terminal holding member is started.

2. The connector of claim 1, wherein the restriction releasing portion is disposed at a position to release the restriction of the restricting portion when the first terminal holding member is properly connected.

3. The connector of claim 1, wherein the first terminal holding member is configured to accommodate the second terminal holding member in a state where the first and second housings are not connected yet, and wherein the first terminal holding member is formed with an accommodation space for accommodating the second terminal holding member in the state where the first and second housings are not connected yet.

4. The connector of claim 1, wherein a rear end part in a connecting direction of the second terminal holding member is disposed to project rearward from the first terminal holding member when the first terminal holding member is connected with the connecting operation of the second terminal holding member restricted.

5. The connector of claim 1, wherein:

the first terminal holding member includes:

a lock arm to be locked to the first housing;

a pair of resilient locking pieces disposed to sandwich the second terminal holding member; and a plurality of first terminal accommodation chambers disposed side by side in one direction, the lock arm and the pair of resilient locking pieces are disposed side by side in a row in a direction intersecting an arrangement direction of the plurality of first terminal accommodation chambers, and at least one of the lock arm and the pair of resilient locking pieces is disposed between two adjacent ones of the first terminal accommodation chambers.

6. The connector of claim 1, wherein:

the second terminal holding member includes:

a locking projection to be locked to the first terminal holding member; and a projecting portion to be fit into a groove portion of the first terminal holding member only when the second terminal holding member is mounted in a proper orientation with respect to the first terminal holding member, and the projecting portion projects in the same direction as the locking projection from an outer surface of the second terminal holding member.

7. A connector, comprising a first housing and a second housing connectable to each other, wherein:

the second housing is configured by assembling a first terminal holding member and a second terminal holding member to be relatively displaceable, the first housing is provided with a restricting portion for allowing a connecting operation of the first terminal holding member and restricting a connecting operation of the second terminal holding member, and the first terminal holding member is provided with a restriction releasing portion for releasing restriction by the restricting portion in a state where the connecting operation of the first terminal holding member is started, wherein a rear end part in a connecting direction of the second terminal holding member is disposed to project rearward from the first terminal holding member when the first terminal holding member is connected with the connecting operation of the second terminal holding member restricted.

* * * * *